| United States Patent [19] | [11] 3,715,345 |
|---|---|
| Smith | [45] Feb. 6, 1973 |

[54] GLUCAGON SEPARATION PROCESS

[75] Inventor: Milton R. Smith, Indianapolis, Ind.

[73] Assignee: Eli Lilly and Company, Indianapolis, Ind.

[22] Filed: Aug. 3, 1970

[21] Appl. No.: 60,617

[52] U.S. Cl. ............260/112.5, 260/112.7, 424/110, 424/177, 424/178
[51] Int. Cl. .........................C07c 103/52, C07g 7/00
[58] Field of Search ........260/112.5, 112.7; 424/110, 424/178

[56] References Cited

FOREIGN PATENTS OR APPLICATIONS 1,054,523   1/1967   Great Britain.....................260/112.7

OTHER PUBLICATIONS

Karaev et al., Izv. Akad. Nauk. Azerb. SSR, Ser. Biol. Nauk 1968 (1), 108–113.

*Primary Examiner*—Lewis Gotts
*Assistant Examiner*—Reginald J. Suyat
*Attorney*—Everet F. Smith and James L. Rowe

[57] ABSTRACT

Glucagon is separated from insulin by using a sulfonated macroreticular styrene-divinylbenzene copolymer resin.

3 Claims, No Drawings

GLUCAGON SEPARATION PROCESS

BACKGROUND OF THE INVENTION

Since the discovery in 1923 of a hyperglycemic factor in the pancreas, considerable research effort has been expended in isolating and purifying the factor, named glucagon by Kimball and Murlin, *J. Biol. Chem.* 58, 337 (1923–24). This research effort culminated in the purification and crystallization of the factor by Staub et al. *Sci.*, 117, 628 (1953); *J. Biol. Chem.* 214, 619 (1955). The amino acid sequence of glucagon, established by Bromer et al., *J. Am. Chem. Soc.* 79, 2807 (1957), consists of 29 amino acids in one linear chain.

To date, glucagon has invariably been isolated from pancreas glands as a by-product of the insulin process, with the glucagon being carried along with the insulin through initial purification steps and recovered as such toward the end of the insulin process. During insulin extraction, however, the chemical environment is maintained at an optimum for insulin isolation with little care being expended to prevent loss of glucagon. Furthermore, during each process step, small amounts of glucagon are lost. By separating glucagon at an early stage in the insulin purification process, these glucagon losses can be minimized.

At present, most commercial methods available for the isolation and purification of insulin are ineffective in separating insulin and glucagon. In addition, the separation of glucagon from other protein-like pancreatic by-products can affect the purity and yield of insulin. Presently used process steps which adversely affect glucagon and/or insulin yields include:

1. The iso-electric precipitation of insulin at about pH 5 – 5.5, first disclosed by Walden in 1924 (see U.S. Pat. No. 1,520,673).
2. The acid extraction and differential salting-out process for insulin first described by Lautenschager and Linder (see U.S. Pat. No. 2,449,076).
3. The ion-exchange process of Jorpes et al. (U.S. Pat. No. 2,878,159) which uses a carboxylic type cation exchange resin or the ion-exchange process of Volini et al. (U.S. Pat. No. 3,069,323) which employs an aminocellulose anion-exchange resin.

It is an object of this invention to provide a process for the separation of glucagon at an early stage in the process of separating and purifying insulin from pancreas glands so as to avoid both undue glucagon losses as well as any deleterious effect on yield or purity of the insulin ultimately obtained.

SUMMARY OF THE INVENTION

In fulfillment of the above and other objects, this invention provides a method for isolating glucagon from solutions containing both glucagon and insulin and permissibly other similar polypeptide substances. My invention is particularly useful in separating glucagon from initial fat-free insulin process crude concentrates which contain glucagon, insulin and other insulin-like polypeptides. According to my novel process, the pH of the insulin-glucagon containing solution, for example, the initial fat-free insulin crude concentrate, is adjusted to about pH = 7 – 8 with base and the resulting solution is passed over an ion-exchange resin consisting of the alkali or alkaline earth metal form of a sulfonated macroreticular styrene-divinylbenzene copolymer (Amberlite 200). The glucagon is preferentially adsorbed while the insulin and other pancreatic enzymes as well as other protein-like materials remain in the eluate. The glucagon is eluted by washing the resin with a dilute base such as aqueous ammonium hydroxide.

The alkali or alkaline earth metals useful in converting the sulfonated macroreticular styrene-divinylbenzene copolymer to the salt form include sodium, potassium, calcium, strontium, barium, or magnesium. Other suitable cations can, of course, be used in place of the alkali metal or alkaline earth cations in the salt form of the resin as will be apparent to those skilled in the art.

DETAILED DESCRIPTION

In actual practice, the novel process of this invention is carried out preferably as follows: An acidic aqueous alcoholic extract of pancreas glands is prepared by contacting ground glands with acidic aqueous ethanol at pH = 2 and then separating the extract from any insoluble material by filtration. Suitable acids for use in preparing the acidic ethanol include phosphoric, hydrochloric, or sulfuric. Although ethanol was specified as the extracting solvent, it will be apparent to those skilled in the art that other volatile, water-miscible solvents can be used. The resulting acidic solution is concentrated by evaporation in vacuo to remove the ethanol. Some fat separates at this point and the alcoholic extract is separated therefrom by decantation and/or filtration. The acidic aqueous solution thus prepared contains both insulin and glucagon. The pH of this solution is adjusted to a pH in the range 7 – 8 and the solution is applied to a sulfonated macroreticular styrene-divinylbenzene copolymer in the alkali metal form, preferably as the potassium salt (commerically available as Amberlite 200). Prior to use, the resin is equilibrated against, for example, a potassium salt such as phosphate potassium at pH – 7.5 or thereabout in order to convert the resin to the salt form. The crude concentrate is applied to the resin bed at a temperature below about 5°C. The solution of crude concentrate which passes through the column is further processed to recover insulin by the usual industrial methods. The resin with glucagon adsorbed thereon is further washed with a suitable buffer, preferably a phosphate buffer, at pH = 7. – 8. These washes are added to insulin process solutions. Washing of the resin with the same buffer is continued until there is no longer an appreciable quantity of protein in the wash as indicated by a lack of UV adsorption at 280 mn. The glucagon is then eluted from the resin with ammonium hydroxide or other base, such as sodium hydroxide, potassium hydroxide, lithium hydroxide, trimethylammonium hydroxide, or the like. The pH of the eluate is next adjusted in the range 2 – 3, and the glucagon precipitated by the addition of sodium chloride. The precipitate is separated by filtration and the resulting salt cake used as a starting material for any standard glucagon purification procedure, as for example see Staub, et al. supra.

Other resin adsorbents such as SE-sephadex, CM-cellulose, IR–120, XE–89, IRC–50, etc. are not as satisfactory as Amberlite 200 and cannot be used in its place without affecting the yield or purity of glucagon eventually obtained.

Example

One hundred pounds of ground beef pancreas were extracted with 65 percent acidic aqueous ethanol at pH = 3.2 (0.02 M phosphoric acid) for 2 hours after which time the solid material was removed by filtration. The pH of the extract was adjusted to 8.2 with $NH_4OH$, thus precipitating ammonium phosphate salts which were also removed by filtration. The pH of the filtrate was then adjusted to 3.6 with dilute sulfuric acid and the resulting solution concentrated by evaporation in vacuo. Fat which separated from the solution upon evaporation of the alcohol was separated by decantation. The resulting concentrate had a volume of 41 liters. The pH of the concentrate was adjusted to 7.5 with 5N potassium hydroxide and then passed over two 4 liter sulfonated macroreticular styrene-divinylbenzene copolymer resin columns in the form of the potassium salt (the columns were previously equilibrated against 0.005M potassium phosphate buffer at pH = 7.5) at a temperature below 5°C. The concentrate was passed over the columns at the rate of 200 ml/min. The columns were next washed with 16 liters of 0.005M phosphate buffer at pH = 7.5 and the washes set aside for use in an insulin purification procedure. The adsorbed glucagon was eluted from the resin by passing 8 liters of 0.1N ammonium hydroxide through the resin bed, then allowing the eluent and resin to equilibrate for 2 hours, and finally completing the elution by passing 16 liters of 0.1N ammonium hydroxide through the resin bed. The pH of the eluate was adjusted at 2.5 with strong acid, and made up to 15 percent sodium chloride by the addition of solid sodium chloride, thus precipitating the glucagon. Up to 97 percent of the glucagon found in the crude concentrate was recovered in the 0.1N ammonium hydroxide eluate.

I claim:

1. The process for separating glucagon from pancreatic extracts containing, in addition to glucagon, insulin and other protein-like pancreatic by-products which comprises passing a pancreatic extract at pH = 7–8 over the alkali metal or alkaline earth metal form of a sulfonated macroreticular styrene-divinylbenzene copolymer whereby said glucagon is adsorbed onto the resin and said insulin remains in solution, and then eluting said glucagon with dilute base.

2. A process according to claim 1, in which the insulin-glucagon containing extract at pH = 7–8 is passed over the potassium form of a sulfonated macroreticular styrene-divinylbenzene copolymer at a temperature below about 5° C. thereby adsorbing said glucagon onto the resin, the insulin remaining in solution, and then eluting said glucagon with 0.1N ammonium hydroxide.

3. A process according to claim 1, in which the glucagon is eluted from the resin by passing 0.1N ammonium hydroxide through the resin bed, allowing the resin and eluent to equilibrate up to 2 hours and then passing sufficient 0.1N ammonium hydroxide over the resin bed to elute substantially all of the glucagon.

* * * * *

PO-1050
(5/69)

UNITED STATES PATENT OFFICE
CERTIFICATE OF CORRECTION

Patent No. 3,715,345        Dated February 6, 1973

Inventor(s) Milton R. Smith

It is certified that error appears in the above-identified patent and that said Letters Patent are hereby corrected as shown below:

Column 4, line 1, "adjusted at 2.5" should read -- adjusted to 2.5--.

Signed and sealed this 17th day of September 1974.

(SEAL)
Attest:

McCOY M. GIBSON JR.
Attesting Officer

C. MARSHALL DANN
Commissioner of Patents